Aug. 23, 1966     C. VAN DER LELY     3,268,011
COMBINATIONS OF TRACTORS WITH AGRICULTURAL IMPLEMENTS
Filed June 26, 1964
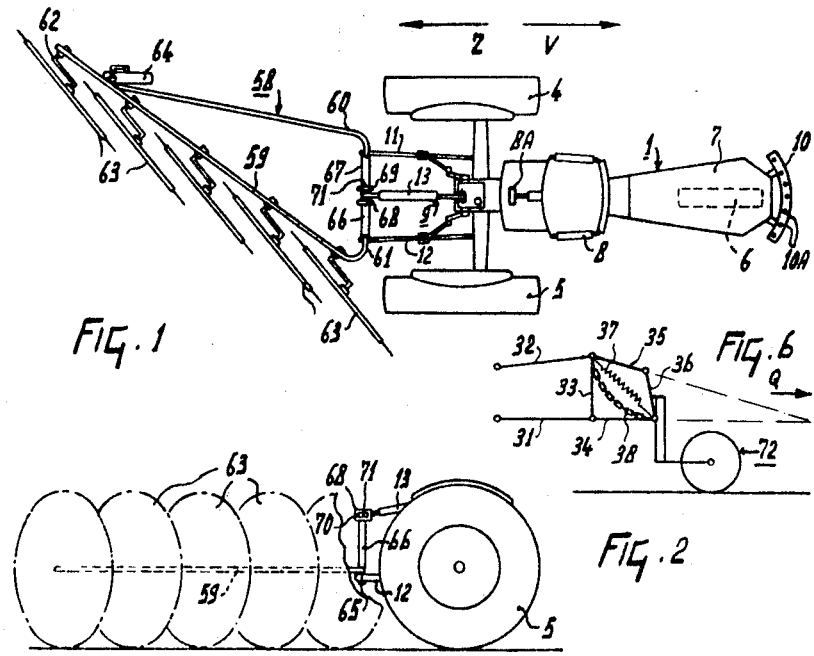
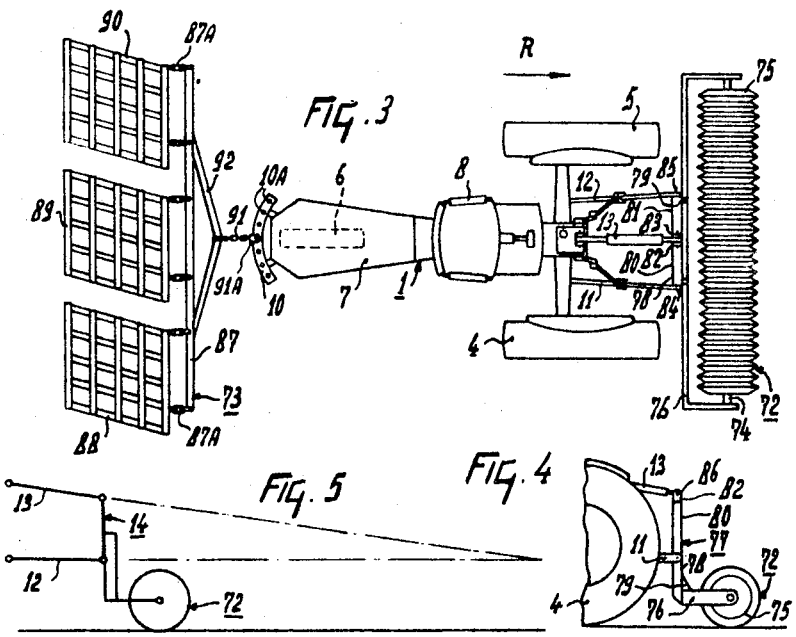
INVENTOR.
CORNELIS VAN DER LELY
BY
Mason, Mason & Albright
                    Attorneys United States Patent Office 3,268,011
Patented August 23, 1966

3,268,011
COMBINATIONS OF TRACTORS WITH
AGRICULTURAL IMPLEMENTS
Cornelis van der Lely, 7 Bruschenrain, Zug, Switzerland
Filed June 26, 1964, Ser. No. 378,127
5 Claims. (Cl. 172—276)

This application is a continuation-in-part of application Serial No. 84,933 filed January 25, 1961, now abandoned.

This invention relates to a combination of a tractor with an agricultural implement which is pushed by the tractor during working.

According to the present invention there is provided in combination a tractor and an agricultural implement which is pushed by the tractor during working, wherein the agricultural implement is coupled with the tractor with the aid of at least two arms located at different levels above the ground and fastened both to the tractor and to the implement so that they are pivotable about horizontal or substantially horizontal axes and so that the axes of the arms intersect each other at a point located in front of the fastening points of the arms to the agricultural implement.

Terms such as "in front," "forward," "rear," are used herein as being with reference to the intended direction of travel of the combination in operation.

For a better understanding of the invention and to show how the same may be carried into effect, reference will now be made by way of example to the accompanying drawings, in which:

FIGURE 1 shows a plan of a side delivery rake connected with a tractor,

FIGURE 2 is a side elevation of the combination shown in FIGURE 1,

FIGURE 3 shows a plan of a roller and a harrow connected with the tractor,

FIGURE 4 is a side elevation of the combination shown in FIGURE 3,

FIGURE 5 is a diagrammatic side elevation of part of the combination shown in FIGURES 3 and 4, FIGURE 6 is similar to FIGURE 5, but shows a modification.

Referring first to FIGURES 1 and 2, there is shown a combination of a tractor 1 and an agricultural implement, namely a side-delivery rake 58. The tractor 1 is supported by two driving wheels 4 and 5 and by a steerable ground wheel 6. The wheels 4 and 5 are spaced and have their axes of rotation in alignment, and the steerable ground wheel 6 is disposed so that it is located near a line midway between the wheels 4 and 5 and perpendicular to their axes of rotation. The tractor 1 has an engine located beneath a bonnet 7, the engine being arranged to drive the wheels 4 and 5 via conventional transmission means. A seat 8 for the driver is mounted on the tractor, the seat being located near to the wheels 4 and 5. Also located near to the wheels 4 and 5 is a hydraulic lifting device 9. At the other end of the tractor 1, there is provided an arcuate towing beam 10 which is formed with a plurality of holes 10A.

The seat 8 is so mounted on the tractor that it is capable of being pivoted about a vertical axis through an angle of at least 180°, and of being fixed in a number of angular positions, with respect to the tractor. The necessary controls for the driving of the tractor are arranged so that they are within reach of the driver on the seat 8 in all its angular positions. For example, the brake pedal 8A is arranged to pivot with the seat. The other controls are not shown in the drawings for the sake of clarity. A suitable steering mechanism is one in which the steerable ground wheel 6 is controlled by hydraulic means. This means may, in turn, be controlled by a lever which is arranged to pivot with the seat 8.

The transmission means of the tractor is preferably arranged so that the tractor can be driven with equal ease and equal speed in either of the two opposite directions indicated by the arrows V and Z in FIGURE 1.

The hydraulic lifting device 9 is in the form of a three-point lifting device, having two lower, co-planar links 11 and 12 and an upper link 13.

The frame of the side-delivery rake 58 comprises three frame beams 59, 60 and 61. Rake wheels 63 are mounted on the frame beam 59 through the intermediary of cranks 62. A caster ground wheel 64 is arranged near the forward end of the frame beam 59 and serves to support the forward end of the rake. Two brackets 65 are fixed to the underside of the frame beam 61, the free ends of the links 11 and 12 being secured to the brackets with the aid of pins. Two obliquely upwardly extending supporting beams 66 and 67 are fixed to the upper side of the frame beam 61, the beams 66 and 67 having vertical plates 68 and 69, respectively, secured to their upper ends. Each plate is formed with a slot 70, and a pin 71 is passed through the slots 70 and through a hole formed in the free end of the link 13. Thus the rake 58 is connected with the three-point lifting device 9 of the tractor 1.

In operation, the tractor 1 is moved in the direction of the arrow Z. The rake wheels 63 are set into rotation by virtue of their contact with the ground and/or the crop lying thereon, and they co-operate to side-delivery rake the crop to the left (as seen in the direction of travel). The tractor 1 therefore travels over a strip of ground which has been worked by the rake and upon which little or no crop lies. During operation, the side-delivery rake 58 is capable of moving vertically with respect to the tractor in order that it may accommodate unevennesses of the ground occurring in the path of travel. During this vertical movement, the rake 58 turns about the axes of the pins by which the rake is connected to the links 11 and 12 of the lifting device, and the vertical plates 68 and 69 are moved with respect to the pin 71 by virtue of the provision of the slot 70. In this case therefore, the links 11, 12 and 13 of the lifting device 9 may be maintained in a fixed position with respect to the tractor.

The rake 58 may be lifted out of contact with the ground by the lifting device 9. When the lifting device 9 is raised, the pin 71 moves to one end of the slot 70, after which the pin bears on the end of the slot and the lifting device 9 lifts the rake out of contact with the ground. It will be apparent that during movement of the above-described combination, the driver thereof has at all times a view of the operation of the implement.

Referring now to FIGURES 3 and 4, there is shown a combination of a tractor 1, a roller 72 and a harrow 73. The tractor is identical with the tractor described with reference to FIGURES 1 and 2, and the various parts of the tractor are designated by the same reference numerals.

The roller 72 has a plurality of discs 75 mounted for rotation upon a stationary axle 74, each disc 75 being of V-section at its periphery. The axle 74 is fixed to a frame beam 76, to which is secured a coupling member 77. This coupling member 77 has two arms 78, which are secured at their lower ends with the aid of web plates 79 to the frame beam 76, and which have two obliquely upwardly extending portions 80 and 81, respectively, the free ends 82 and 83 of the portions 81 and 82 being bent so as to extend vertically. Pins 84 and 85 are disposed near the lower ends of the arms 78, these pins serving to connect the coupling member 77 to the lifting links 11 and 12 of the three-point lifting device of the tractor. A pin 86 is passed through holes formed in the ends 82 and 83 of the arms 78 and 79, and through the hole in the end of the lifting link 13 of the lifting device. The roller 72 is thus connected with the tractor. Since the links 11, 12 and 13 of the three-point lifting device are capable of pivotal movement with respect to the tractor, the roller 72 is capable of moving vertically with respect to the tractor, in response to ground irregularities occurring in the line of travel.

FIGURE 5 shows diagrammatically the coupling of the roller 72 to the links of the lifting device. As seen in FIGURE 5, the links 11, 12 and 13 are so arranged that the axis of the link 13 cuts the plane containing the axes of the links 11 and 12, at a point located in front of the roller, with reference to the intended direction of travel. It will be apparent from FIGURE 5 that the links 11 and 12 of the lifting device are located in a substantially horizontal plane, when the roller 72 is resting on level ground, while the upper arm 13 of the lifting device extends obliquely downwardly. When the roller moves vertically in order to accommodate ground irregularities, the links 11, 12 and 13 move pivotally with respect to the tractor. Due to the above-described coupling of the roller 72 to the tractor, the roller does not tend to drive itself into the ground when it encounters depressions therein.

FIGURE 6 shows diagrammatically a further method of coupling the roller 72 (or another agricultural implement) to the links of the lifting device, this method being used when the links are not arranged to be freely pivotable, during operation, about their points of connection to the tractor. In FIGURE 6, the three-point lifting device there shown has two lower links 31 and an upper link 32. A coupling member 33 is attached to the ends of the links 31 and 32, the coupling member consisting of a triangular framework. At least two arms 34 and 35 are arranged to be attached to the coupling member 33 at different heights above the ground. A further coupling member in the form of an arm 36 is pivotally connected to the arms 34 and 35, and the roller 72 is fixed to the arm 36. The roller 72 is intended to be moved in operation in the direction indicated by the arrow Q in FIGURE 6. As may be seen in FIGURE 6, the axis of the arm 35 intersects the axis of the arm 34, or cuts the horizontal plane containing the arm 34, at a point located in front of the points of connection of these arms to the roller 72. It will also be seen that the point of connection of the lower arm or arms 34 with the coupling member 36 is located in front of the point of connection of the upper arm 35 to the coupling member.

A tension spring 37 and a chain 38 are secured between the point of connection of the lower arm 34 with the coupling member 36 and the point of connection of the upper arm 35 with the coupling member 33. The spring 37 restrains downward movement of the roller 72 when the roller encounters any ground irregularity occurring in the line of travel. When it is required to transport the roller 72, the lifting device of the tractor is raised, and the chain 38 supports the roller 72 so that the roller is lifted clear of the ground.

It will be appreciated that the arms 34 and 35 may, if desired, be pivoted directly to the tractor. This is particularly advantageous if the tractor is not provided with a lifting device at its forward end.

A harrow 73 is coupled to the towing beam 10 at the rear of the tractor. The harrow 73 comprises a beam 87 to which are secured three spiked frames 88, 89 and 90 with the aid of chains 87A. The harrow is connected to the tractor with the aid of a chain 91, one end of which is secured to the mounting beam 10 through the intermediary of a fork 91A and a pin, and the other end of which is secured to a bent arm 92 welded to the beam 87.

In operation, the combination of the tractor 1, the roller 72 and the harrow 73 is moved in the direction indicated by the arrow R in FIGURE 3. This combination enables a strip of ground to be simultaneously rolled and harrowed using only one tractor. Large clods are crushed by the pushed roller and the strip of ground is thereafter further broken up and levelled by the harrow. By virtue of the fact that only the single ground wheel 6 is located at the rear end of the tractor, the possibility of the coming into contact of the harrow with the wheel is avoided, even during the traversing of bends. If two wheels, spaced apart by the same distance as the wheels 4 and 5, were provided at the rear of the tractor, the harrow 73 may often come into contact with one of the wheels when traversing bends. It will be apparent that either the roller or the harrow may be used alone if desired, and that either the roller or the harrow may be used in combination with a different implement.

What I claim is:

1. In combination, a tractor and an agricultural implement adapted to be connected to the forward part of said tractor and pushed in normal farming operations, at least two arms extending forwardly from the forward part of said tractor, said agricultural implement being coupled to said tractor by said arms and disposed forward of said tractor, said two arms located at different levels above the ground, said arms being pivotally fastened both to said tractor and said implement for pivoting about substantially horizontal axes, said horizontal axes of said pivots intersecting a vertical plane along the longitudinal axis of the tractor, the points of intersection with said vertical plane forming corners of a trapezium, a forward planar extension through the two upper of said horizontal axes intersecting with a forward planar extension through the two lower of said horizontal axes in front of said agricultural implement, whereby when said agricultural implement encounters obstructions in the ground said agricultural implement tends to move upwardly and rearwardly with respect to said tractor.

2. A combination in accordance with claim 1, including a resilient member connected to said tractor, the weight of said implement being supported at least in part thereby.

3. A combination in accordance with claim 1 including a chain member interconnected at a first place to said tractor and at a second place to said agricultural implement, said second place lower than said first place, whereby downward movement of said agricultural implement is limited by said chain member.

4. A combination in accordance with claim 1 including a lifting device in said tractor wherein said arms constitute a part of said lifting device.

5. A combination in accordance with claim 1 wherein said implement is coupled to said tractor by a coupling member, said coupling member interconnecting said tractor and said implement, said coupling member including said arms.

References Cited by the Examiner

UNITED STATES PATENTS

| | | | |
|---|---|---|---|
| 2,336,410 | 12/1943 | McKay | 172—449 X |
| 2,444,321 | 6/1948 | Woolridge | 172—277 |
| 2,551,870 | 5/1951 | Bridger | 172—449 |
| 2,564,355 | 8/1951 | Danuser. | |
| 2,566,547 | 9/1951 | Bartlett. | |
| 2,713,299 | 7/1955 | Shager et al. | 172—307 X |
| 2,839,980 | 6/1958 | Evans et al. | 172—449 |
| 2,841,067 | 7/1958 | Magarian | 172—7 |
| 2,858,756 | 11/1958 | Magarian | 172—7 |

FOREIGN PATENTS

| | | |
|---|---|---|
| 62,731 | 2/1955 | France. |
| 1,073,132 | 3/1954 | France. |
| 1,134,610 | 12/1956 | France. |

ABRAHAM G. STONE, *Primary Examiner.*

F. B. HENRY, R. L. HOLLISTER, *Assistant Examiners.*